(12) United States Patent
Malmborg

(10) Patent No.: US 9,140,139 B2
(45) Date of Patent: Sep. 22, 2015

(54) STRUCTURAL JOINT FOR CONNECTING A FIRST COMPONENT TO A SEGMENTED SECOND COMPONENT

(75) Inventor: Eric W. Malmborg, Amston, CT (US)

(73) Assignee: United Technologies Corporation, Hartford, CT (US)

( * ) Notice: Subject to any disclaimer, the term of this patent is extended or adjusted under 35 U.S.C. 154(b) by 915 days.

(21) Appl. No.: 13/309,131

(22) Filed: Dec. 1, 2011

(65) Prior Publication Data
US 2013/0142643 A1    Jun. 6, 2013

(51) Int. Cl.
*F01D 25/24*    (2006.01)

(52) U.S. Cl.
CPC .......... *F01D 25/243* (2013.01); *F05D 2230/60* (2013.01); *F05D 2260/31* (2013.01); *Y10T 403/645* (2015.01)

(58) Field of Classification Search
CPC .... F01D 25/243; F01D 25/265; F01D 25/246
USPC ............. 415/214.1, 213.1, 215.1, 220, 182.1; 403/337, 344, 335, 336
See application file for complete search history.

(56) References Cited

U.S. PATENT DOCUMENTS

| 3,764,226 | A | 10/1973 | Matto |
|---|---|---|---|
| 5,569,018 | A | 10/1996 | Mannava et al. |
| 6,339,878 | B1 | 1/2002 | Owen et al. |
| 6,766,639 | B2 | 7/2004 | Malmborg |
| 6,807,803 | B2 | 10/2004 | Poccia et al. |
| 6,881,032 | B2 | 4/2005 | Malmborg |
| 7,811,053 | B2 | 10/2010 | Balamucki et al. |
| 2007/0160471 | A1 | 7/2007 | Welch |
| 2010/0074735 | A1* | 3/2010 | Cai et al. ........................ 415/177 |
| 2010/0239424 | A1 | 9/2010 | Maalouf et al. |
| 2010/0266387 | A1 | 10/2010 | Bintz et al. |
| 2010/0266401 | A1 | 10/2010 | Bintz et al. |
| 2011/0085904 | A1 | 4/2011 | Gossmann |

FOREIGN PATENT DOCUMENTS

JP    60147856    10/1985

OTHER PUBLICATIONS

International search report for PCT/US2012/067375 dated Feb. 7, 2013.

* cited by examiner

*Primary Examiner* — Edward Look
*Assistant Examiner* — Maxime Adjagbe
(74) *Attorney, Agent, or Firm* — O'Shea Getz P.C.

(57) ABSTRACT

A structural joint includes a first flange, a second flange and a fastener with a head and a shaft. The first flange extends out from a first component to a distal first flange end. The second flange extends out from a segmented second component to a distal second flange end. The second flange includes a first lateral flange segment that extends laterally to a first flange sidewall, and a second lateral flange segment that extends laterally to a second flange sidewall, which is engaged with the first flange sidewall. The head is encased in the second flange and extends laterally into the first flange sidewall and the second flange sidewall. The shaft extends longitudinally out from the second flange and through the first flange.

20 Claims, 3 Drawing Sheets

STRUCTURAL JOINT FOR CONNECTING A FIRST COMPONENT TO A SEGMENTED SECOND COMPONENT

BACKGROUND OF THE INVENTION

1. Technical Field

The present invention relates generally to structural joints and, in particular, to a structural joint for connecting, for example, a first gas turbine engine case to a segmented second gas turbine engine case.

2. Background Information

A gas turbine engine compressor may include a non-segmented compressor case connected to a segmented (or split) compressor case. The non-segmented compressor case may include an annular attachment flange. The segmented compressor case may be divided into two axially extending case segments (or halves), which may be connected together by a pair of axially extending bolted split flanges. Each case segment typically includes a circumferentially extending flange, which is bolted to a respective portion of the annular attachment flange. The bolted split flanges, however, typically intersect ends of the circumferentially extending flanges. The ends of the circumferentially extending flanges therefore may not be bolted to the annular attachment flange, which may permit gas leakage between and reduce structural integrity of the non-segmented and segmented compressor cases.

SUMMARY OF THE DISCLOSURE

According to a first aspect of the invention, a structural joint includes a first flange, a second flange and a fastener with a head and a shaft. The first flange extends from a first component to a distal first flange end. The second flange extends from a segmented second component to a distal second flange end. The second flange includes a first lateral flange segment that extends laterally to a first flange sidewall, and a second lateral flange segment that extends laterally to a second flange sidewall that is engaged with the first flange sidewall. The head is encased in the second flange and extends laterally into the first flange sidewall and the second flange sidewall. The shaft extends longitudinally out from the second flange and through the first flange.

According to a second aspect of the invention, a gas turbine engine case includes a first flange, a second flange and a fastener with a head and a shaft. The first flange extends radially from a first engine case to a distal first flange end, and includes a first fastener aperture extending axially through the first flange. The second flange extends radially from a segmented second engine case to a distal second flange end, and includes a first circumferential flange segment, a second circumferential flange segment and a second fastener aperture extending axially into the second flange. The first circumferential flange segment extends circumferentially to a first flange sidewall, and the second circumferential flange segment extends circumferentially to a second flange sidewall that is engaged with the first flange sidewall. The second fastener aperture is formed by a first fastener pocket in the first flange sidewall and a second fastener pocket in the second flange sidewall. The head is seated in the second fastener aperture, and the shaft extends out from the second fastener aperture and through the first fastener aperture.

The foregoing features and the operation of the invention will become more apparent in light of the following description and the accompanying drawings.

DETAILED DESCRIPTION OF THE INVENTION

Figure 1:
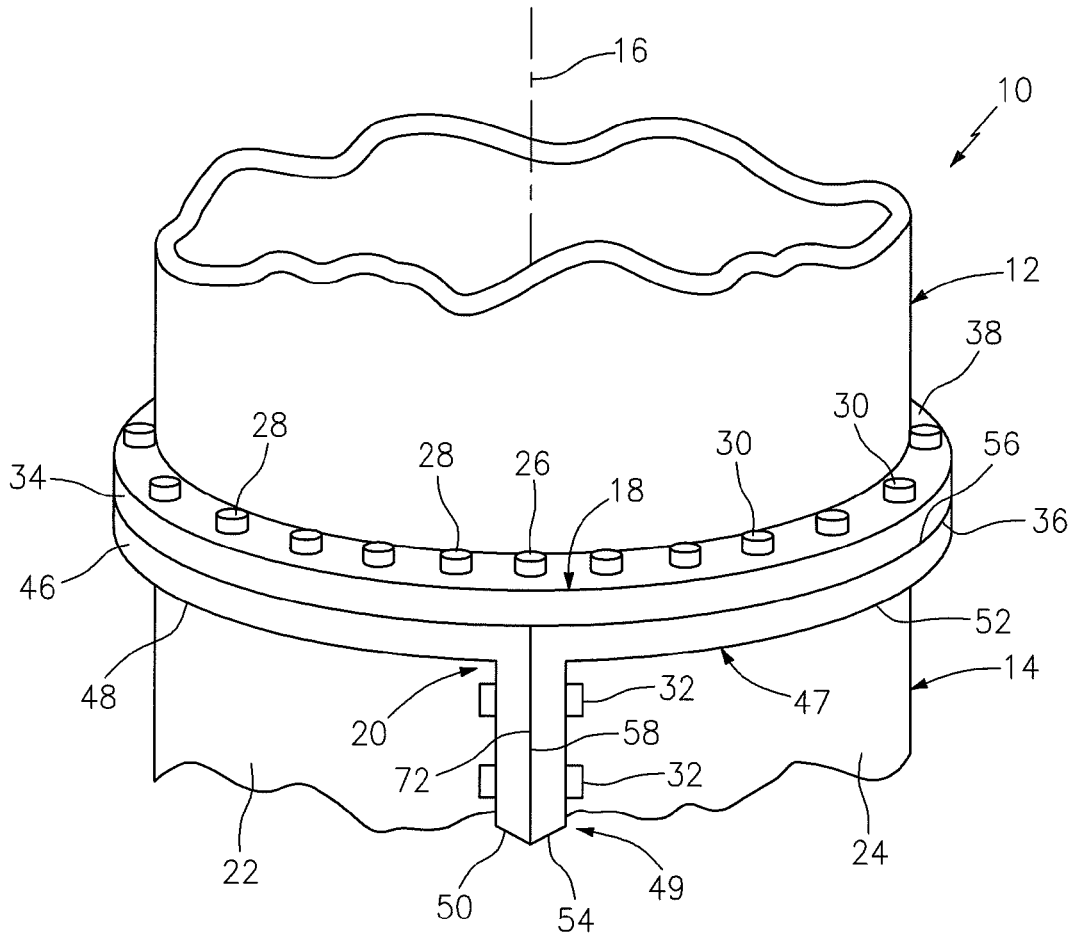
FIG. 1 is a partial perspective illustration of a gas turbine engine case.

FIG. 1 illustrates a gas turbine engine case 10 with a structural joint that connects a first engine case 12 (e.g., a full-hoop tubular compressor case) to a segment second engine case 14 (e.g., a split tubular compressor case) with one or more fasteners. The first engine case 12 extends longitudinally (e.g., axially) along an axial centerline 16 to a first flange 18. The second engine case 14 extends longitudinally to a segmented second flange 20, and may include a first case segment 22 and a second case segment 24. The fasteners may include a first fastener 26 (e.g., a slab head bolt) and a plurality of second fasteners, e.g., 28, 30 and 32.

Figure 2:
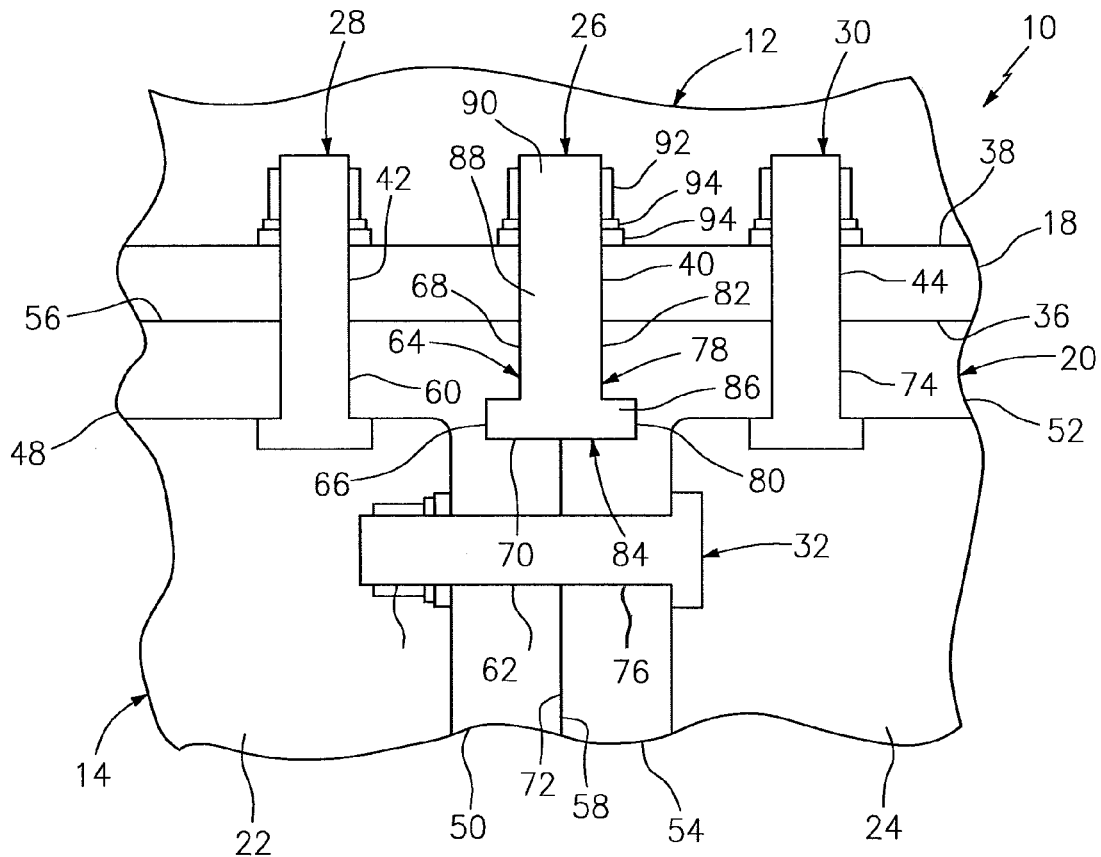
FIG. 2 is a partial side-sectional illustration of the engine case illustrated in FIG. 1.

The first flange 18 extends radially out from the first engine case 12 to a distal first flange end 34. The first flange 18 may have an annular cross-sectional geometry that extends longitudinally between a first flange end 36 and a second flange end 38. Referring to FIG. 2, the first flange 18 may include a plurality of fastener apertures, e.g., 40, 42 and 44 arranged circumferentially around the first engine case 12. Each fastener aperture 40, 42, 44 extends longitudinally through the first flange 18 between the first flange end 36 and the second flange end 38.

Referring to FIG. 1, the second flange 20 extends radially out from the second engine case 14 to a distal second flange end 46. The second flange 20 may include an annular flange 47 and one or more split flanges 49. The annular flange 47 may include a first lateral (e.g., circumferential) flange segment 48 and a second lateral flange segment 52. Each split flange 49 may include a first longitudinal (e.g., axial) flange segment 50 and a second longitudinal flange segment 54. The first lateral flange segment 48 and the second lateral flange segment 52 may each have an arcuate (e.g., semi-circular) cross-sectional geometry. The first longitudinal flange segment 50 and the second longitudinal flange segment 54 may each have a substantially linear cross-sectional geometry.

The first lateral flange segment 48 and the first longitudinal flange segment 50 extend radially from the first case segment 22 to the distal second flange end 46. The first lateral flange segment 48 extends laterally (e.g., circumferentially) along a first flange end 56 to a first flange sidewall 58. The first longitudinal flange segment 50 extends longitudinally along the first flange sidewall 58 to the first lateral flange segment 48. Referring to FIG. 2, the first lateral flange segment 48 may include a plurality of fastener apertures 60 that extend longitudinally therethrough. The first longitudinal flange segment 50 may also include a plurality of fastener apertures 62 that extend laterally therethrough.

Figure 3:
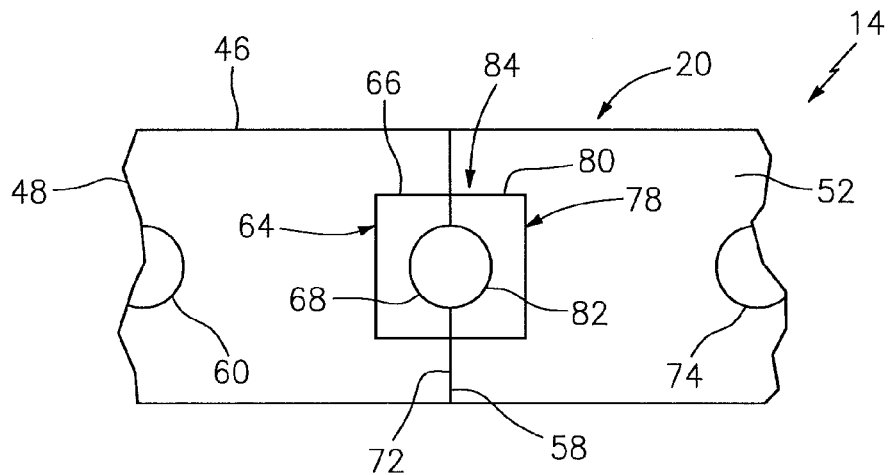
FIG. 3 is a partial cross-sectional illustration of the engine case illustrated in FIG. 1.

A first fastener pocket 64 extends laterally into the first flange sidewall 58, and may include a first pocket segment 66 and a second pocket segment 68. The first pocket segment 66 extends longitudinally from a pocket endwall 70 to the second pocket segment 68. The second pocket segment 68 extends longitudinally from the first pocket segment 66 to the first flange end 56. Referring to FIG. 3, the first pocket segment 66 may have, for example, a rectangular cross-sectional geometry. The second pocket 68 may have, for example, a semi-circular cross-sectional geometry.

Referring to FIG. 1, the second lateral flange segment 52 and the second longitudinal flange segment 54 extend radially from the second case segment 24 to the distal second flange end 46. The second lateral flange segment 52 extends laterally along the first flange end 56 to a second flange sidewall 72. The second longitudinal flange segment 54 extends longitudinally along the second flange sidewall 72 to the second lateral flange segment 52. Referring to FIG. 2, the second lateral flange segment 52 may include a plurality of fastener apertures 74 that extend longitudinally therethrough. The second longitudinal flange segment 54 may also include a plurality of fastener apertures 76 that extend laterally therethrough.

A second fastener pocket 78 extends laterally into the second flange sidewall 72, and may include a first pocket segment 80 and a second pocket segment 82. The first pocket segment 80 extends longitudinally from the pocket endwall 70 to the second pocket segment 82. The second pocket segment 82 extends longitudinally from the first pocket segment 80 to the first flange end 56. Referring to FIG. 3, the first pocket segment 80 may have, for example, a rectangular cross-sectional geometry. The second pocket segment 82 may have, for example, a semi-circular cross-sectional geometry.

Referring to FIG. 2, the first flange end 36 engages (e.g., sealingly contacts) the first flange end 56, and the first flange sidewall 58 engages the second flange sidewall 72. The first fastener 26 is arranged in a fastener aperture 84 formed by the first fastener pocket 64 and the second fastener pocket 78. A first fastener head 86 with, for example, a substantially square cross-sectional geometry may be seated in the first pocket segments 66 and 80 and, thus, may be embedded (e.g., removably encased) within the second flange 20. The square cross-sectional geometry of the first fastener head 86 and the rectangular cross-sectional geometries of the first pocket segments 80 may cooperate to prevent rotation of the first fastener 26 within the flanges 18 and 20. A first fastener shaft 88 with, for example, a circular cross-sectional geometry may extend longitudinally through the second pocket segments 68 and 82 and the fastener aperture 40 to a shaft tip 90. A nut 92 and one or more washers 94 may be mated with the shaft tip 90. The first fastener 26 therefore secures the second engine case 14 to the first engine case 12 at the intersection of the first case segment 22 and the second case segment 24. The second fastener 28 extends through the fastener apertures 42 and 60, and secures the first case segment 22 to the first engine case 12. The second fastener 30 extends through the fastener apertures 44 and 74, and secures the second case segment 24 to the first engine case 12. The second fastener 32 extends through the fastener apertures 62 and 76, and secures the first case segment 22 to the second case segment 24.

Figure 5:
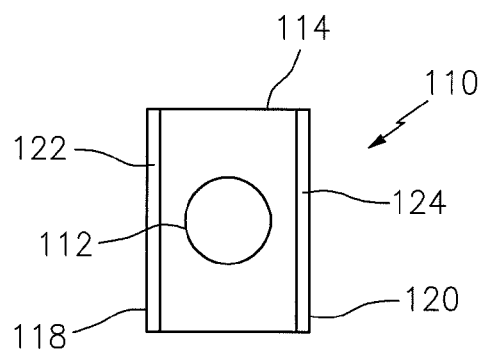
FIG. 5 is an illustration of a fastener included in the engine case illustrated in FIG. 4.
Figure 4:
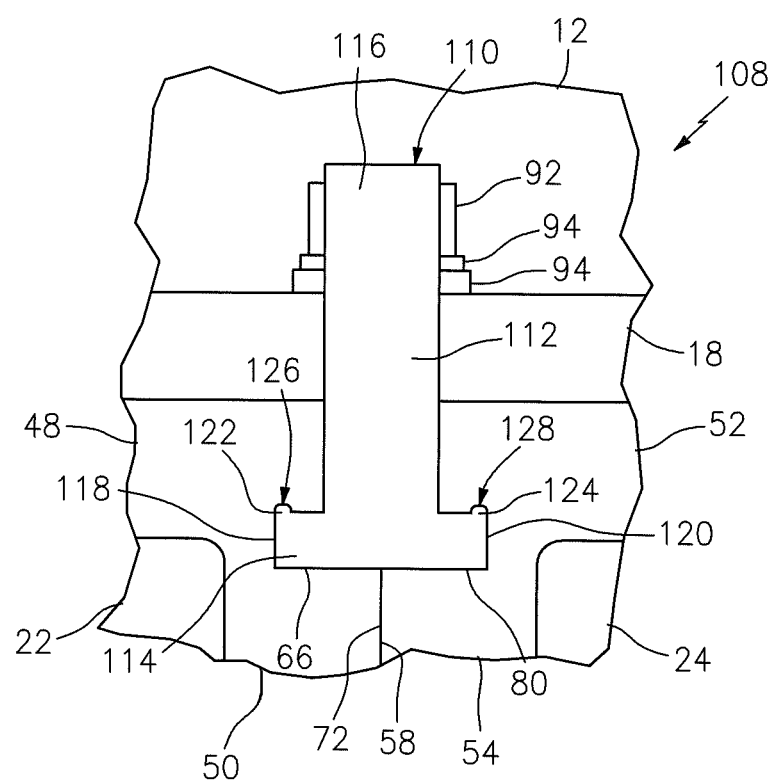
FIG. 4 is a partial side-sectional illustration of another gas turbine engine case.

FIG. 4 is a partial side-sectional illustration of another gas turbine engine case 108. In contrast to the engine case 10 illustrated in FIG. 2, the engine case 108 includes an alternate embodiment first fastener 110. Referring to FIGS. 4 and 5, the first fastener 110 includes a (e.g., cylindrical) fastener shaft 112 that extends from a fastener head 114 to a shaft tip 116. The fastener head 114 extends between a first head side 118 and a second head side 120. The fastener head 114 may have an elongated (e.g., rectangular) cross-sectional geometry, and may include a first retention rail 122 located at the first head side 118 and a second retention rail 124 located at the second head side 120. Referring to FIG. 4, the first retention rail 122 extends longitudinally into a radial slot 126, and the second retention rail 124 extends longitudinally into a radial slot 128. The radial slots 126 and 128 may each extend longitudinally into a respective one of the first and the second lateral flange segments 48, 52 from a respective one of the first pocket segments 66, 80. The retention rails 122 and 124 and the radial slots 126 and 128 may cooperate during engine operation to prevent (or reduce the likelihood of) separation of the first flange sidewall 58 and the second flange sidewall 72.

In other embodiments, the first fastener may have a head with an elliptical or hexagonal cross-sectional geometry.

While various embodiments of the present invention have been disclosed, it will be apparent to those of ordinary skill in the art that many more embodiments and implementations are possible within the scope of the invention. Accordingly, the present invention is not to be restricted except in light of the attached claims and their equivalents.

What is claimed is:

1. A structural joint, comprising:
   a first flange extending out from a first component to a distal first flange end;
   a second flange extending out from a segmented second component to a distal second flange end, and comprising a first lateral flange segment extending laterally to a first flange sidewall and a second lateral flange segment extending laterally to a second flange sidewall that is engaged with the first flange sidewall; and
   a fastener comprising a head and a shaft, wherein the head is encased in the second flange and extends laterally into the first flange sidewall and the second flange sidewall, and the shaft extends longitudinally out from the second flange and through the first flange.

2. The structural joint of claim 1, further comprising:
   a second fastener extending axially through the first lateral flange segment and the first flange; and
   a third fastener extending axially through the second lateral flange segment and the first flange.

3. The structural joint of claim 1, wherein the second flange further comprises
   a first longitudinal flange segment extending longitudinally to the first lateral flange segment along the first flange sidewall;
   a second longitudinal flange segment extending longitudinally to the second lateral flange segment along the second flange sidewall; and
   a second fastener extending laterally through the first longitudinal flange segment and the second longitudinal flange segment.

4. The structural joint of claim 1, wherein the head comprises a rectangular cross-sectional geometry.

5. The structural joint of claim 1, wherein the head comprises an elliptical cross-sectional geometry.

6. The structural joint of claim 1, wherein the head comprises a hexagonal cross-sectional geometry.

7. The structural joint of claim 1, wherein a fastener aperture extends longitudinally into the second flange, and is formed by a first fastener pocket in the first flange sidewall and a second fastener pocket in the second flange sidewall, and wherein the head and a portion of the shaft are seated in the fastener aperture.

8. The structural joint of claim 7, wherein the first fastener pocket and the second fastener pocket each comprise a first pocket segment that receives a respective portion of the head and a second pocket segment that receives a respective portion of the shaft.

9. The structural joint of claim 8, wherein the head extends between a first head side and a second head side, and comprises a first retention rail located at the first head side and a second retention rail located at the second head side, and the first retention rail and the second retention rail each extend longitudinally into a slot in a respective one of the first pocket segments.

10. The structural joint of claim 1, wherein the first flange comprises an annular cross-sectional geometry, and the first lateral flange segment and the second lateral flange segment each comprise an arcuate cross-sectional geometry.

11. A gas turbine engine case, comprising:
a first flange extending radially from a first engine case to a distal first flange end, and comprising a first fastener aperture extending axially through the first flange;
a second flange extending radially from a segmented second engine case to a distal second flange end, and comprising a first circumferential flange segment, a second circumferential flange segment and a second fastener aperture extending axially into the second flange, the first circumferential flange segment extending circumferentially to a first flange sidewall, and the second circumferential flange segment extending circumferentially to a second flange sidewall that is engaged with the first flange sidewall, wherein the second fastener aperture is formed by a first fastener pocket in the first flange sidewall and a second fastener pocket in the second flange sidewall; and
a fastener comprising a head seated in the second fastener aperture, and a shaft extending out from the second fastener aperture and through the first fastener aperture.

12. The engine case of claim 11, further comprising:
a second fastener extending axially through the first circumferential flange segment and the first flange; and
a third fastener extending axially through the second circumferential flange segment and the first flange.

13. The engine case of claim 11, wherein the second flange further comprises
a first axial flange segment extending axially to the first circumferential flange segment along the first flange sidewall;
a second axial flange segment extending axially to the second circumferential flange segment along the second flange sidewall; and
a second fastener extending through the first axial flange segment and the second axial flange segment.

14. The engine case of claim 11, wherein the head comprises a rectangular cross-sectional geometry.

15. The engine case of claim 11, wherein the head comprises an elliptical cross-sectional geometry.

16. The engine case of claim 11, wherein the head comprises a hexagonal cross-sectional geometry.

17. The engine case of claim 11, wherein the first fastener pocket and the second fastener pocket each comprise a first pocket segment that receives a respective portion of the head and a second pocket segment that receives a respective portion of the shaft.

18. The engine case of claim 17, wherein the head extends between a first head side and a second head side, and comprises a first retention rail located at the first head side and a second retention rail located at the second head side, the first retention rail and the second retention rail each extending axially into a slot in a respective one of the first pocket segments.

19. The engine case of claim 11, wherein the first flange comprises an annular cross-sectional geometry, and the first circumferential flange segment and the second circumferential flange segment each comprise an arcuate cross-sectional geometry.

20. The engine case of claim 11, wherein the first engine case comprises a first compressor case, and the second engine case comprises a second compressor case.

\* \* \* \* \*